March 12, 1957     H. C. CLEVENGER     2,784,682
APPARATUS FOR FILLING SANDWICH BUNS
Filed Dec. 15, 1955
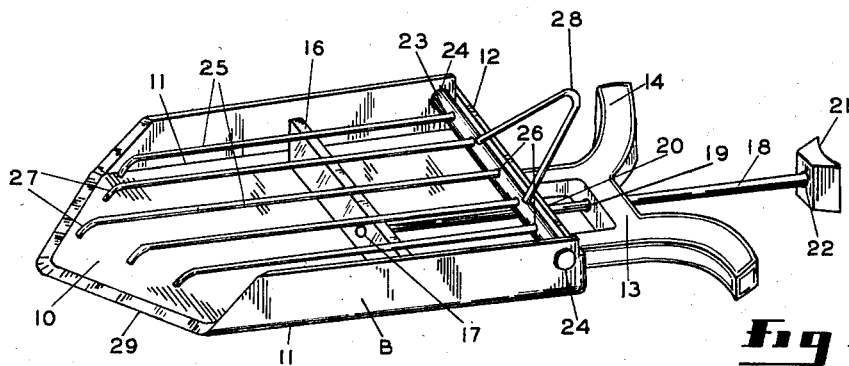
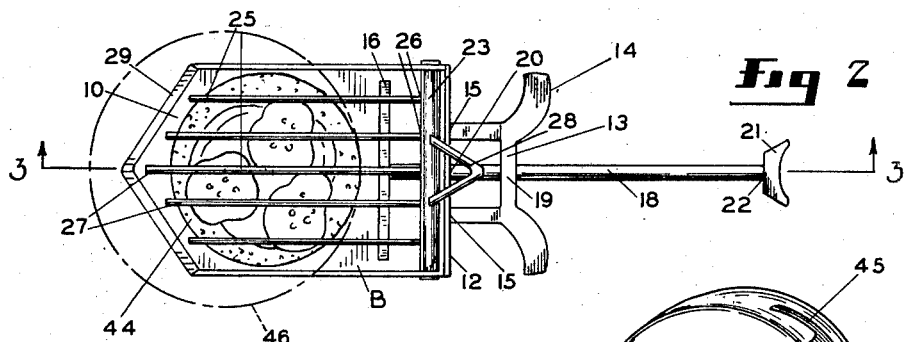
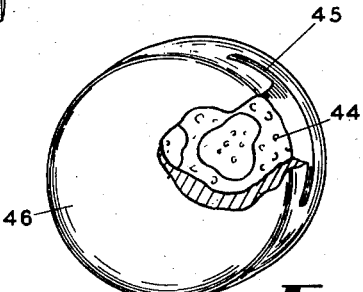
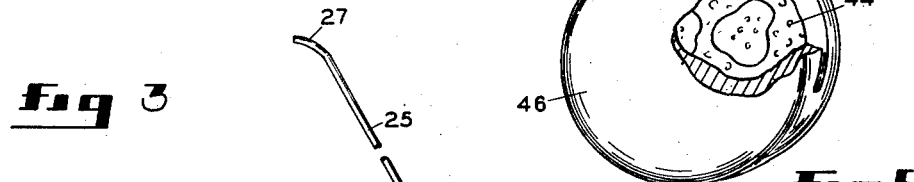
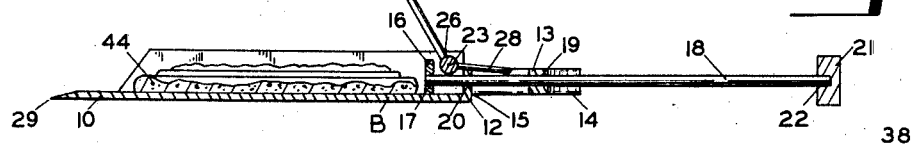
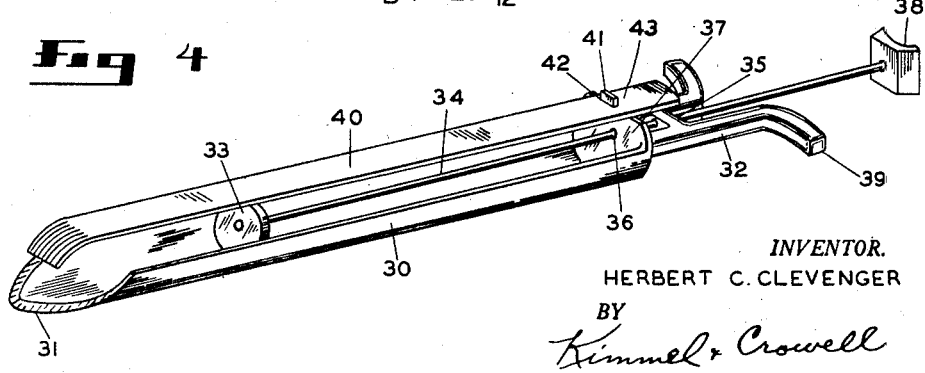
*INVENTOR.*
HERBERT C. CLEVENGER
BY
Kimmel & Crowell
ATTORNEYS

2,784,682

APPARATUS FOR FILLING SANDWICH BUNS

Herbert C. Clevenger, Milwaukie, Oreg.

Application December 15, 1955, Serial No. 553,280

2 Claims. (Cl. 107—1)

The invention relates to apparatus for making hamburgers or hot dogs.

The primary object of the invention is to provide apparatus for inserting the filling of a sandwich, including the meat and other ingredients, into the bun, in such a manner as to prevent the ingredients from dripping from the bun while being eaten.

Another object of the invention is to provide a device used for holding meat and other ingredients while the same are inserted through a small opening in the bun and deposited therein.

Other objects and advantages will become apparent in the following specification when considered in the light of the attached drawing, in which:

Figure 1 is a perspective view of a device for inserting a hamburger patty and other ingredients into a bun.

Figure 2 is a plan view of the device holding the patty and other ingredients in a bun, the bun being illustrated by broken lines.

Figure 3 is a longitudinal cross section taken on the line 3—3 of Figure 2, looking in the direction of the arrows, showing the device in position for placing the patty and other ingredients therein into a bun.

Figure 4 is a perspective view of a modified device for inserting a weiner within a bun in the making of hot dog sandwiches.

Figure 5 is a perspective view of a hamburger sandwich, partially broken away, which has been filled following the instant method and using the device illustrated in Figures 1 through 3.

Referring now to the drawing in detail wherein like reference numerals indicate like parts throughout the several figures, the reference numeral B indicates generally the body of the device consisting of a blade 10, having its sides 11 turned up and its rear 12 also turned up, or in other words the sides 11 and rear wall 12, including the blade 10, form a one piece unit B. Extending rearwardly from the rear wall 12 of the device B is a handle 13 having a pair of ears 14 extending laterally thereof providing means of gripping the same by the fingers of the operator. This handle 13 may be secured to the rear wall 12 by any suitable means at 15, such as welding.

An ejector bar 16 is fixedly secured to an end 17 of a plunger rod 18. The rod 18 is adapted to pass through a guideway 19 formed in the handle 13 and a guideway 20 formed in the rear wall 12 of the device B. A push button 21 is fixedly secured to the plunger rod 18 at 22, and is adapted to be operated by the thumb of the operator in a manner which will later be described.

A shaft 23 is journalled within the side walls 11 of the device B by bearings 24, formed within the side walls 11. Fingers 25 are fixedly mounted to the shaft 23 by any suitable means 26, and have their outer ends 27 flared downwardly. Extending rearwardly from the shaft 23 is a lever 28 which is adapted to pivot the shaft 23 and the fingers 25 to the position shown in Figure 3. The tip of the blade 11 is bevelled or sharpened along the edge 29.

Referring to Figure 4, a modified form of structure is shown which is adapted for inserting weiners into a bun to form a hot dog sandwich. It consists of an elongated trough like body member 30 having a sharpened tip 31. The body member 30 is provided with a handle 32 at one end thereof. An ejector plunger 33 is seated in the body member 30 and is fixedly secured to an end of a plunger rod 34, which is adapted to reciprocate through the guide 35 on the handle 32 and the guide 36 within the rear wall 37 of the trough 30. The handle 32 is secured to the outer face of the rear wall 37 by welding or the like.

The plunger rod 34 has a button 38 to be engaged by the operator's thumb with his fingers being applied to ears 39 of the handle 32. A weiner hold down finger 40 is pivotally mounted over the rear wall 37 of the device and is held in position by the projection 41. The projection 41 passes through an opening 42 formed in the finger 40 and is of such shape as to maintain the finger 40 thereon and in alignment with the trough 30.

The finger 40 has a portion 43 extending rearwardly from the projection 41 which is adapted to be contacted by the thumb of the operator for raising the finger 40 slightly above the trough 30 while the weiner is being inserted therein.

Referring to Figure 5, a bun 46 is shown which has been filled with hamburger 44 by using the method herein described and/or the structure B shown in Figures 1 through 3. The use of one opening 45 only in the bun 46 permits the filler B to be inserted within the bun 46 with the rest of the periphery of the bun remaining closed, thus preventing any of the filler 44 from leaking out of the bun 46 after the sandwich is made.

The operation of the structural aspects of the invention will now be described. Referring to the structure B shown in Figures 1 through 3, the operator presses on the lever 28 raising the fingers 25 to the position shown in Figure 3. The hamburger patty 44 is then placed on the top surface of the blade 10, along with other ingredients such as lettuce, pickles, mustard and the like. Next the operator releases the lever 28 allowing the fingers 25 to take the position shown in Figures 1 and 2, with the fingers 25 maintaining the patty 44 and other ingredients between the side walls 11 on the blade 10.

With one hand the operator grasps the bun 46 to be used in the hamburger sandwich, inserts the tip of the blade 10 into one side of the bun 46, and then moves the blade 10 on into the bun, as shown in Figure 2. On completing this insertion he places his thumb on the button 21, grasps the ears 14 pulling the device B out of the bun 46 at the same time forcing the plunger 18 forward. This causes the ejector bar 16 to hold the filler from coming out of the bun 46 while withdrawing the device B.

A similar operation is employed for the structure illustrated in Figure 4 to form a hot dog sandwich following the same method. The operator puts his thumb on the lever 41 of the finger 40 raising the same slightly while moving the ejector plunger 33 to the rear of the device by the plunger 34. The ingredients are placed in the bottom of the trough 30, after which the weiner is laid thereon. The tip 31 of the device is inserted in the end of a hot dog bun, the device being forced into the bun short of the end of the same. The operator then withdraws the device pressing on the button 38 and ejecting the filler by the ejector plunger 33, leaving the filler within the bun.

In the instant invention the method followed in forming a sandwich consists generally of providing a sandwich bun having a single opening to receive a filling then supporting a sandwich filling in the bun and then simultaneously withdrawing the filling support while holding the filling within the bun.

Having thus described the preferred embodiments of the invention, it should be understood that numerous other modifications and structural adaptations may be resorted to without departing from the scope of the appended claims.

What is claimed is:

1. A sandwich filling device comprising a filling supporting plate, a pair of side walls extending upwardly from said plate, a rear wall extending upwardly from said plate and connecting said side walls, an ejector slidably carried by said plate, means secured to said ejector for reciprocating said ejector on said plate, a shaft pivotally supported in said side walls, a plurality of clamping fingers extending forwardly from said shaft in parallel relation to said plate, and means for pivoting said clamping fingers away from said plate.

2. A device as claimed in claim 1 wherein the forward edge of said plate is forwardly tapered and sharpened.

References Cited in the file of this patent
UNITED STATES PATENTS

| | | |
|---|---|---|
| 1,848,030 | Sibley | Mar. 1, 1932 |
| 1,917,137 | Marchio | July 4, 1933 |
| 2,118,976 | Larkin | May 31, 1938 |